United States Patent
Savage, Jr.

[11] Patent Number: 5,818,995
[45] Date of Patent: Oct. 6, 1998

[54] LENS UNIT AND LIGHT PIPE ASSEMBLY

[76] Inventor: John M. Savage, Jr., 538-B Via De La Valle, Solana Beach, Calif. 92075

[21] Appl. No.: 645,626

[22] Filed: May 14, 1996

Related U.S. Application Data

[63] Continuation-in-part of Ser. No. 391,113, Feb. 21, 1995, Pat. No. 5,548,676, which is a continuation-in-part of Ser. No. 278,246, Jul. 21, 1994, Pat. No. 5,440,658, which is a continuation-in-part of Ser. No. 142,938, Oct. 29, 1993, Pat. No. 5,466,174, which is a continuation-in-part of Ser. No. 82,963, Jun. 29, 1993, Pat. No. 5,368,503.

[51] Int. Cl.$^6$ ................................................. G02B 6/42
[52] U.S. Cl. ............................... 385/92; 385/33; 385/79; 385/93
[58] Field of Search .......................... 385/60–63, 78, 385/79, 81, 88, 92, 93, 133, 147, 31, 33–35, 36, 37

[56] References Cited

U.S. PATENT DOCUMENTS

| | | | |
|---|---|---|---|
| D. 200,157 | 1/1965 | Vincent | D13/146 |
| 1,747,896 | 2/1930 | Gates | 439/682 |
| 2,042,199 | 5/1936 | Thomas | 362/226 |
| 2,396,725 | 3/1946 | Thomas, Jr. | 439/590 |
| 2,786,937 | 3/1957 | Arnejo | 362/308 |
| 2,796,593 | 6/1957 | Offerman | 439/63 |
| 2,829,359 | 4/1958 | Ritter | 439/56 |
| 2,949,595 | 8/1960 | Doeleman | 338/70 |
| 2,951,226 | 8/1960 | Gittens | 439/58 |
| 2,977,562 | 3/1961 | Benson | 439/58 |
| 2,999,895 | 9/1961 | Smith | 174/138 G |
| 3,184,536 | 5/1965 | Vincent | 174/138 G |
| 3,335,387 | 8/1967 | Mueller | 439/56 |
| 3,564,231 | 2/1971 | Bruce et al. | 362/32 |
| 3,601,786 | 8/1971 | Brubaker | 439/853 |
| 3,621,445 | 11/1971 | Horecky et al. | 439/81 |
| 3,624,385 | 11/1971 | Wall | 362/32 |
| 3,663,931 | 5/1972 | Brown | 439/75 |
| 3,721,815 | 3/1973 | Wall | 362/32 |
| 3,887,803 | 6/1975 | Savage, Jr. | 362/363 |
| 3,975,072 | 8/1976 | Ammon | 439/70 |
| 4,035,681 | 7/1977 | Savage, Jr. | 313/110 |
| 4,195,330 | 3/1980 | Savage, Jr. | 362/226 |
| 4,219,172 | 8/1980 | Murayama | 248/27.3 |
| 4,230,387 | 10/1980 | Zahn | 439/590 |
| 4,398,240 | 8/1983 | Savage, Jr. | 362/311 |
| 4,402,110 | 9/1983 | Savage, Jr. | 16/225 |
| 4,461,537 | 7/1984 | Raymer, II et al. | 385/88 |
| 4,471,414 | 9/1984 | Savage, Jr. | 362/226 |
| 4,491,900 | 1/1985 | Savage, Jr. | 362/230 |
| 4,513,356 | 4/1985 | Mikola | 362/226 |
| 4,534,616 | 8/1985 | Bowen et al. | 385/79 |
| 4,691,985 | 9/1987 | Shank et al. | 385/84 |
| 4,711,518 | 12/1987 | Shank et al. | 385/79 |
| 4,718,744 | 1/1988 | Manning | 385/79 |
| 4,727,648 | 3/1988 | Savage, Jr. | 29/839 |
| 4,821,152 | 4/1989 | Lorenzen | 361/767 |
| 4,822,302 | 4/1989 | Dorleans | 439/544 |
| 4,837,927 | 6/1989 | Savage, Jr. | 29/839 |
| 4,986,625 | 1/1991 | Yamada et al. | 385/55 |
| 4,986,772 | 1/1991 | Fukutani | 439/892 |
| 5,068,771 | 11/1991 | Savage, Jr. | 362/255 |
| 5,071,375 | 12/1991 | Savage, Jr. | 439/853 |
| 5,163,109 | 11/1992 | Okugawa et al. | 385/94 |
| 5,193,099 | 3/1993 | Chou | 372/107 |
| 5,283,802 | 2/1994 | Hsiung | 372/107 |
| 5,288,242 | 2/1994 | Muzslay | 439/349 |
| 5,368,503 | 11/1994 | Savage, Jr. | 439/502 |
| 5,440,658 | 8/1995 | Savage, Jr. | 385/79 |
| 5,466,174 | 11/1995 | Savage, Jr. | 439/596 |
| 5,548,676 | 8/1996 | Savage, Jr. | 385/92 |

FOREIGN PATENT DOCUMENTS

| | | |
|---|---|---|
| 2390032 | 12/1978 | France . |
| 1464176 | 2/1969 | Germany . |
| 2250007 | 5/1974 | Germany . |
| 2918620 | 11/1980 | Germany . |
| 2081516 | 2/1982 | United Kingdom . |

*Primary Examiner*—John D. Lee
*Attorney, Agent, or Firm*—William W. Haefliger

[57] ABSTRACT

A light transmission device, comprising in combination a longitudinally axially extending light pipe; and a lens unit having a light transmitting end wall and structure extending away from the end wall generally axially and sidewardly of the light pipe, the light pipe and the lens unit retained in assembled relation, whereby light is transmitted from the light pipe to the end wall.

18 Claims, 3 Drawing Sheets

LENS UNIT AND LIGHT PIPE ASSEMBLY

This application is a continuation-in-part of Ser. No. 08/391,113 filed Feb. 21, 1995, now U.S. Pat. No. 5,548,676, which is a continuation-in-part of Ser. No. 08/278,246 filed Jul. 21, 1994, now U.S. Pat. No. 5,440,658 issued Aug. 8, 1995, which is a continuation-in-part of Ser. No. 08/142,938 filed Oct. 29, 1993, now U.S. Pat. No. 5,466,174 issued Nov. 14, 1995, which is a continuation-in-part of Ser. No. 08/082,963, filed Jun. 29, 1993, now U.S. Pat. No. 5,368,503 issued Nov. 24, 1994.

BACKGROUND OF THE INVENTION

Such applications and patents are incorporated herein, by reference.

This invention relates generally to optical coupling of light sources and fiber optics cables, or light pipes; and more particularly concerns optical coupling of lens units and light fibers in such a way as to position the light pipe to receive light transmission from a light source spaced endwise from the light source, such as an LED.

There is need for improved apparatus and method to overcome difficulties in optical coupling as between light sources, light pipes and lenses.

SUMMARY OF THE INVENTION

It is a major object of the invention to provide improvements in such optical coupling as will meet the referenced need. Basically a light transmission device in accordance with the invention comprises:

a) a longitudinally axially extending light pipe, and b) a lens unit having a light transmitting end wall and structure extending away from the end wall generally axially and sidewardly of the light pipe, c) the light pipe and the lens unit retained in assembled relation, whereby light is transmitted from the light pipe to the end wall.

It is another important object to provide an interlocking relationship as between the lens unit structure and the light pipe; and for this purpose the light pipe may have an exterior flange to which the lens unit structure couples. Such structure may incorporate multiple spring fingers coupling to the flange on the light pipe, the light pipe received into the lens structure.

A further object is to locate the referenced end wall of the lens unit in axial alignment with the light pipe, that end wall having light transmitting facets.

A further object is to provide the spring fingers to be spaced about the light pipe axis, and to define longitudinally extending gaps therebetween, and there being a protrusion on the light pipe extending into one of said gaps to engage at least one of the spring fingers and block rotation of the pipe relative to the lens unit, about said axis.

An additional object is to provide the spring fingers with cam surfaces, to be spread apart in response to axial movement of the light pipe relative to the spring fingers.

A further object is to provide a light source spaced axially from the light pipe and directed axially toward the light pipe. That source may comprise an LED; and two panels may be provided, one to support the lens unit and the other to support the LED, in fixed spaced relation, whereby the LED may be replaced without disturbing the light pipe or lens unit.

And, yet another object is to provide a method of positioning a lens unit, light pipe and light source in coaxial light transmitting relation, that includes:

a) providing a panel, b) assembling the lens unit to the panel to project through an opening in the panel, c) assembling the light pipe and lens unit to position the light pipe relative to the lens unit and to also hold the lens unit assembled to the panel, d) and relatively locating the light source and light pipe to transmit light endwise into the light pipe, for transmission through the lens unit.

These and other objects and advantages of the invention, as well as the details of an illustrative embodiment, will be more fully understood from the following specification and drawings, in which:

DRAWING DESCRIPTION

DETAILED DESCRIPTION

Figure 1:
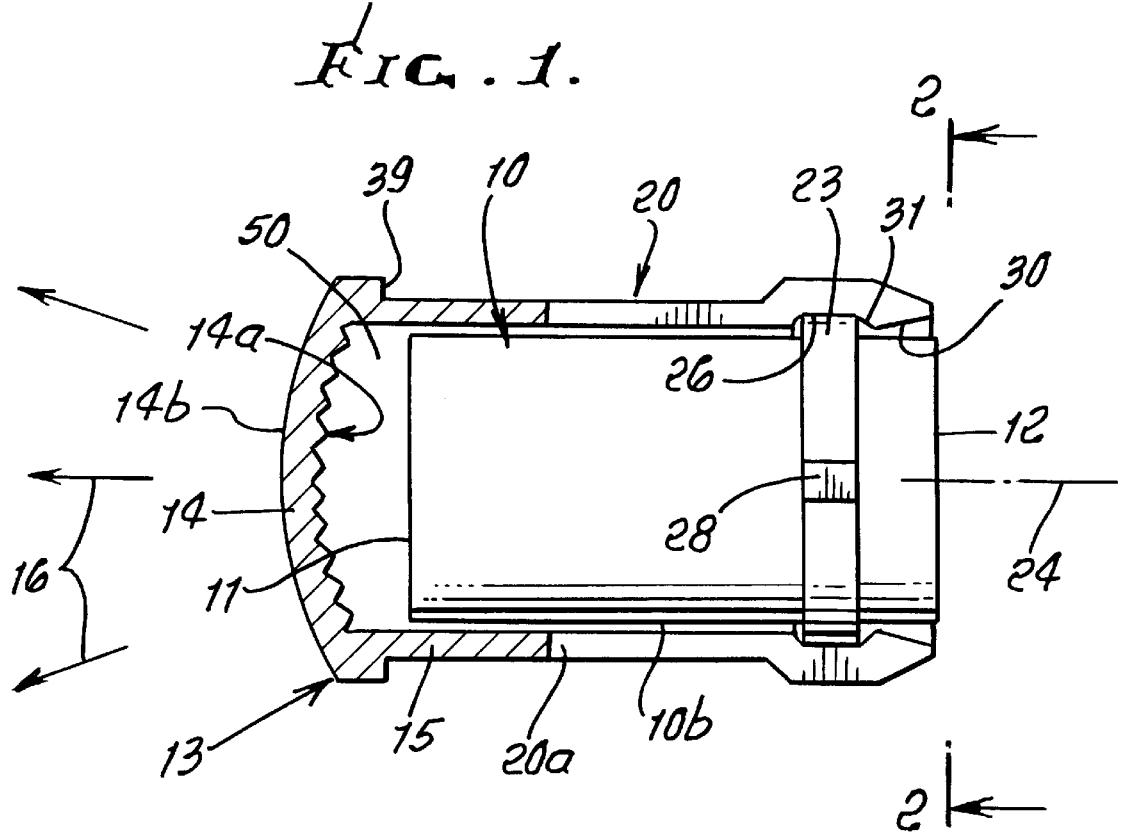
FIG. 1 is an elevation taken in section to show intercoupling of a light pipe and lens unit.

In FIG. 1, a light pipe 10 or fiber optics cable, of relatively short length between its opposite ends 11 and 12, is endwise received leftwardly into a lens unit 13 to be fixedly positioned coaxially relative to that unit. The lens has a light transmitting end wall 14, or lens, and a skirt 15 integral with that end wall and extending axially rightwardly. The end 11 of the pipe 10 directly faces 14, which has facets 14*a* on the end wall interior face to receive and diffuse light transmitted axially by the short pipe. Note gap at 50, and the leftwardly convex outer surface 14*b* of the lens wall 14, to transmit light as in directions indicated by arrows 16.

Figure 2:
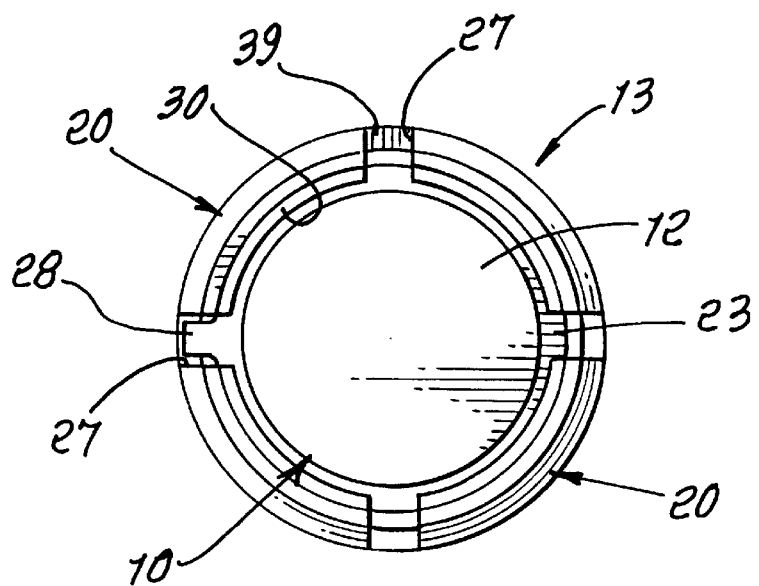
FIG. 2 is a section taken on lines 2—2 of FIG. 1.
Figure 3:
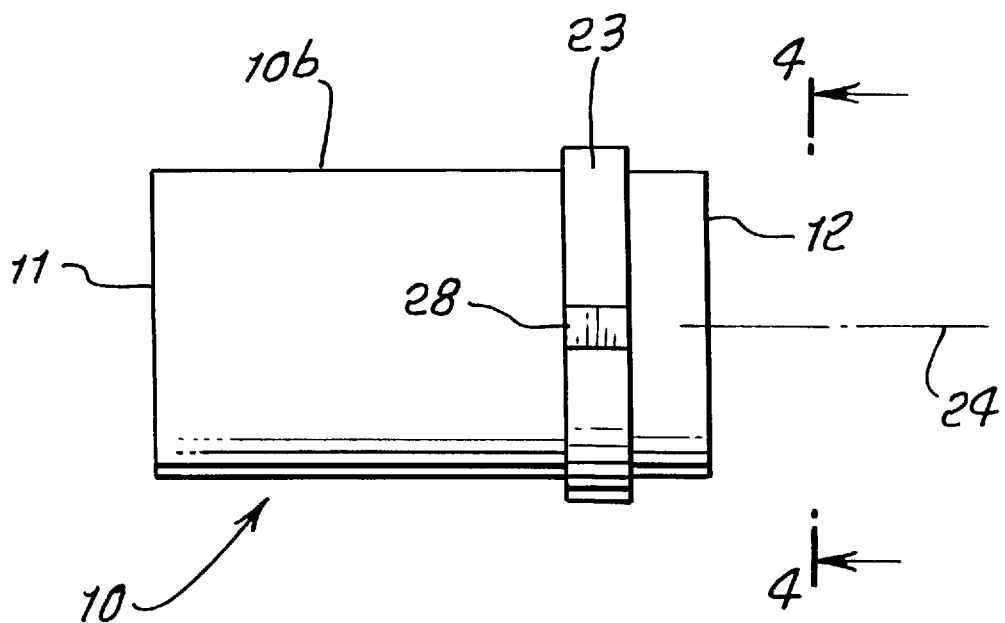
FIG. 3 is a side elevation showing the light pipe.
Figure 4:
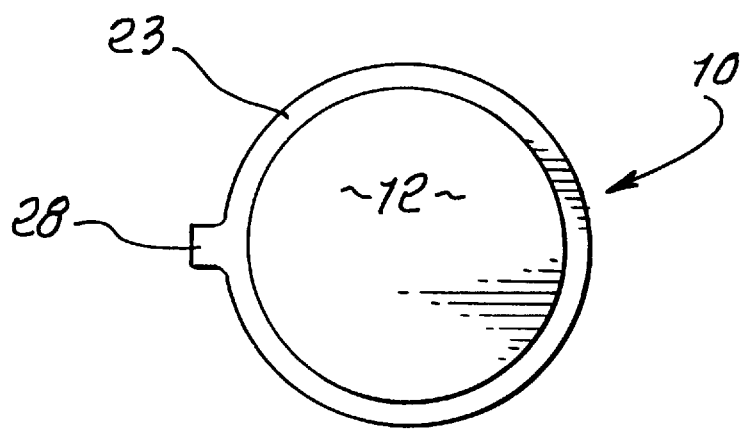
FIG. 4 is an end view taken on lines 4—4 of FIG. 3.

The lens unit has structure extending away from end wall 14 generally axially rightwardly, and sidewardly of the light pipe side wall 10*b*. That structure may be considered as retention structure in the form of like spring fingers 20 spaced about the axis 21. Four such fingers may be provided, as indicated in FIG. 2. Those fingers have leftward ends 20*a* integral with and projecting rightwardly from skirt 15, as shown, and rightward ends to be yieldably resiliently spread apart as the light pipe is assembled leftwardly into the lens unit, facilitating ready intercoupling of the light pipe and lens unit in intercoupled relation, as for example in tongue and groove relation precisely coaxially positioning these elements.

As shown the light pipe has an exterior flange 23 extending about axis 24, and the fingers have grooves 26 into which the flange is received upon assembly. The groove lengths match the flange length, so that the pipe is held in coaxial relation to the lens unit.

Longitudinally extending gaps 27 are formed between successive spring fingers, and a protrusion 28 on the light pipe flange extends radially outwardly into one of the gaps. Its sideward engagement with one of the fingers blocks relative rotation of the pipe and lens unit, about axis 24. The fingers have cam surfaces thereon to be spread apart upon relative axial movement of the pipe relative to the fingers. As shown there are certain cam surfaces 30 that are divergent in a direction away from the lens unit end wall; and there are other cam surfaces 31 that are convergent in a direction away from the lens unit end wall. Surfaces 30 are spread apart as the light pipe is pushed endwise into the lens unit, and surfaces 31 are spread apart when the light pipe is displaced endwise away from the lens unit.

Figure 5:
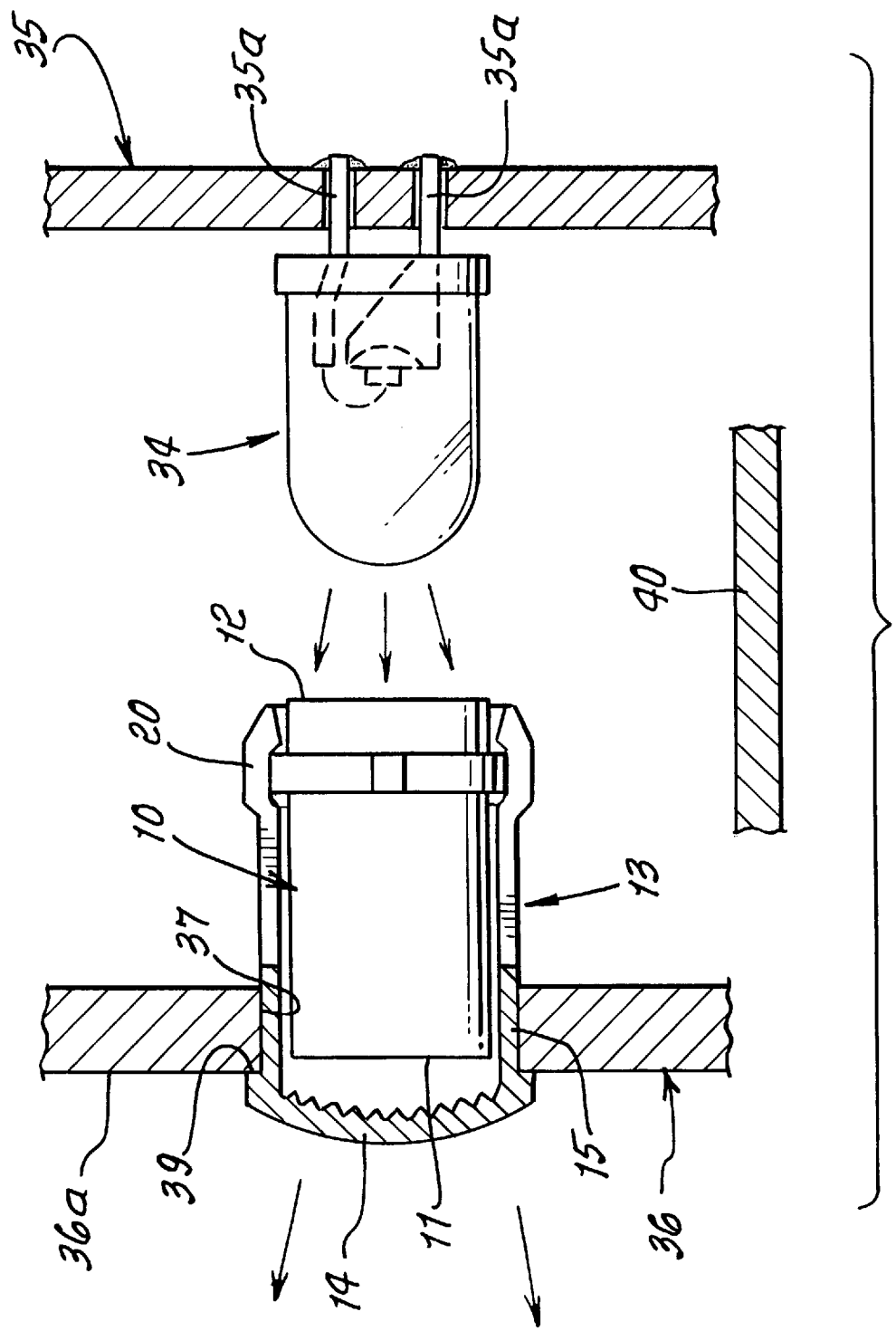
FIG. 5 is an elevation taken in section to show positioning of the lens unit and light pipe, relative to a light source such as an LED, and with two panels supporting the lens unit and light source.

FIG. 5 shows a light source such as LED 34 spaced axially from the end 12b of the light pipe, and directed toward that end. Accordingly, when LED 34 is "ON", light is transmitted to and through the light pipe, and through the end wall or lens 14. A panel 35 carries the LED at terminals 35a connectible to circuitry, and a panel 36 carries the lens unit. Note skirt 15 close reception in an opening 37 formed in the panel 36, as upon initial rightward flexing reception of the lens unit spring fingers through that opening. Subsequently, the light pipe 10 is assembled into the panel mounted lens unit 13, and into the position shown. Such assembly also holds the lens unit spring fingers against the panel bore forming the opening 37, whereby a rigid coaxial positioning of the lens unit and light pipe relative to the panel 36 is obtained. See also positioning shoulder 39 formed by the lens unit, and engaging wall 36a of the panel. Mounting structure 40 holds the panels 35 and 36 in the positions shown.

Lens unit 13 may consist of synthetic resinous (plastic) material, which is light transparent.

Lens unit 13 may have rectangular (such as square) cross section, in planes normal to axis 24, rather than cylindrical as shown.

I claim:

1. A light transmission device, comprising in combination:
   a) a longitudinally axially extending light pipe, and
   b) a lens unit having a light transmitting end wall and structure extending away from said end wall generally axially and sidewardly of the light pipe,
   c) the light pipe and said lens unit retained in assembled relation, whereby light is transmitted from said light pipe to said end wall,
   d) said structure including resiliently yieldable spring finger means for retaining the lens unit assembled to the light pipe.

2. The combination of claim 1 wherein said structure and said light pipe have interlocking relation, the light pipe received relatively endwise into the lens unit.

3. The combination of claim 1 wherein said end wall has an inner face directed axially toward said light pipe, said inner wall having facets.

4. The combination of claim 1 including a light source spaced axially from the light pipe and directed axially toward the light pipe.

5. The combination of claim 4 wherein the light source comprises an LED.

6. The combination of claim 4 wherein said light pipe has a light entrance end spaced from said unit end wall, and including an LED facing and spaced from said pipe light entrance end to transmit light into the light pipe via said entrance end.

7. The combination of claim 6 including a support panel carrying said LED, and another support panel supporting said lens unit, said panels longitudinally spaced apart in fixed relation.

8. The combination of claim 1 wherein said lens unit has a cylindrical cross section.

9. The combination of claim 1 wherein said lens unit has a rectangular cross section.

10. A light transmission device, comprising in combination:
    a) a longitudinally axially extending light pipe, and
    b) a lens unit having a light transmitting end wall and structure extending away from said end wall generally axially and sidewardly of the light pipe,
    c) the light pipe and said lens unit retained in assembled relation, whereby light is transmitted from said light pipe to said end wall,
    d) and wherein said structure includes multiple spring fingers, and said light pipe and fingers have interlocking relation.

11. The combination of claim 10 wherein said light pipe and fingers have tongue and groove interlocking relation.

12. The combination of claim 10 wherein said light pipe has an exterior flange, and at least one of said fingers has a groove receiving at least part of said flange.

13. The combination of claim 10 wherein said lens unit has an axis and said spring fingers are spaced apart about said axis, and define longitudinally extending gaps therebetween, and there being a protrusion on the light pipe extending into one of said gaps to engage at least one of the spring fingers and block rotation of the pipe relative to the lens unit, about said axis.

14. The combination of claim 10 wherein said spring fingers have cam surfaces thereon to be spread apart in response to axial movement of the light pipe relative to the spring fingers.

15. The combination of claim 14 wherein said cam surfaces are divergent in a direction away from said lens unit end wall.

16. The combination of claim 14 wherein said cam surfaces are convergent in a direction away from said lens unit end wall.

17. The combination of claim 10 wherein the light pipe has a substantially cylindrical side wall in closely spaced relation to said spring fingers.

18. The method of positioning a lens unit, light pipe and light source in coaxial light transmitting relation, that includes:
    a) providing a panel,
    b) assembling the lens unit to the panel to project through an opening in the panel,
    c) assembling the light pipe and lens unit to position the light pipe relative to the lens unit and to also hold the lens unit assembled to the panel, said assembly including providing means including resiliently yieldable spring finger means acting in conjunction with the lens unit to resiliently and yieldably retain the light pipe assembled to the panel,
    d) and relatively locating the light source and light pipe to transmit light endwise into the light pipe, for transmission through the lens unit.

* * * * *